United States Patent
Hartular

(10) Patent No.: US 6,873,322 B2
(45) Date of Patent: Mar. 29, 2005

(54) ADAPTIVE LCD POWER SUPPLY CIRCUIT

(75) Inventor: Alexandru Hartular, Campbell, CA (US)

(73) Assignee: 02Micro International Limited, Georgetown (KY)

( * ) Notice: Subject to any disclaimer, the term of this patent is extended or adjusted under 35 U.S.C. 154(b) by 272 days.

(21) Appl. No.: 10/164,666

(22) Filed: Jun. 7, 2002

(65) Prior Publication Data

US 2003/0227452 A1 Dec. 11, 2003

(51) Int. Cl.$^7$ ............................................. G09G 5/00
(52) U.S. Cl. ........................................ 345/212; 345/211
(58) Field of Search ............................ 345/211–213; 307/31

(56) References Cited

U.S. PATENT DOCUMENTS

| | | | |
|---|---|---|---|
| 4,472,672 A | 9/1984 | Pacholok | 320/21 |
| 4,535,399 A | 8/1985 | Szepesi | 363/20 |
| 4,541,041 A | 9/1985 | Park et al. | 363/41 |
| 4,586,119 A | 4/1986 | Sutton | 363/17 |
| 4,621,313 A | 11/1986 | Kiteley | 363/49 |
| 4,672,528 A | 6/1987 | Park et al. | 363/98 |
| 4,727,469 A | 2/1988 | Kammiller | 363/56 |

(Continued)

OTHER PUBLICATIONS

"An Introduction to the Principles and Features of Resonant Power Conversion", Steve Freeland, from *Recent Developments in Resonant Power Conversion*, Intertec Communications, Inc., 1988, pp. 20–43.

"Zero–Voltage Switching Technique In DC/DC Converters", Kwang–Hwa Liu and Fred C. Lee, from *Recent Developments in Resonant Power Conversion*, Intertec Communications, Inc., 1988, pp. 211–223.

"A New and Improved Control Technique Greatly Simplifies the Design of ZVS Resonant Inverters and DC/DC Power Supplies", Mehmet K. Nalbant, 1995 IEEE, pp. 694–701.

*Switching Power Supply Design*, Abraham I. Pressman, McGraw–Hill, 1991, pp. 93–104; 471–492.

(Continued)

Primary Examiner—Amare Mengistu
Assistant Examiner—Tom Sheng
(74) Attorney, Agent, or Firm—Grossman, Tucker, Perreault & Pfleger, PLLC

(57) ABSTRACT

An adaptive LCD power supply circuit for adjusting at least one supply parameter in response to at least one load parameter of an associated load includes a feedback path configured to sense at least one load parameter and provide a control signal representative of at least one load parameter, and a regulating circuit configured to accept the control signal and regulate at least one supply parameter based on the control signal. The feedback path may include a first path to provide a first signal representative of a load condition of a first module, and a second path to provide a second signal representative of a load condition of a second load module, and a minimum decision circuit to output a third signal equal to the lesser of the first and second signals. An electronic device including an adaptive LCD power supply circuit is also provided.

27 Claims, 3 Drawing Sheets

U.S. PATENT DOCUMENTS

| | | | |
|---|---|---|---|
| 4,794,506 A | 12/1988 | Hino et al. | 363/17 |
| 4,814,962 A | 3/1989 | Magalhaes et al. | 363/16 |
| 4,833,584 A | 5/1989 | Divan | 363/37 |
| 4,855,888 A | 8/1989 | Henze et al. | 363/132 |
| 4,860,189 A | 8/1989 | Hitchcock | 363/132 |
| 4,864,483 A | 9/1989 | Divan | 363/37 |
| 4,912,622 A | 3/1990 | Steigerwald et al. | 363/98 |
| 4,935,857 A | 6/1990 | Nguyen et al. | 363/17 |
| 4,952,849 A | 8/1990 | Fellows et al. | 315/307 |
| 4,953,068 A | 8/1990 | Henze | 363/17 |
| 4,992,919 A | 2/1991 | Lee et al. | 363/17 |
| 5,017,800 A | 5/1991 | Divan | 307/66 |
| 5,027,263 A | 6/1991 | Harada et al. | 363/16 |
| 5,027,264 A | 6/1991 | DeDoncker et al. | 363/16 |
| 5,105,127 A | 4/1992 | Lavaud et al. | 315/291 |
| 5,113,334 A | 5/1992 | Tuson et al. | 363/25 |
| 5,132,888 A | 7/1992 | Lo et al. | 363/17 |
| 5,132,889 A | 7/1992 | Hitchcock et al. | 363/17 |
| 5,157,592 A | 10/1992 | Walters | 363/17 |
| 5,198,969 A | 3/1993 | Redl et al. | 363/17 |
| 5,208,740 A | 5/1993 | Ehsani | 363/124 |
| 5,231,563 A | 7/1993 | Jitaru | 363/98 |
| 5,235,501 A | 8/1993 | Stuart et al. | 363/17 |
| 5,268,830 A | 12/1993 | Loftus, Jr. | 363/17 |
| 5,285,372 A | 2/1994 | Huynh et al. | 363/132 |
| 5,291,382 A | 3/1994 | Cohen | 363/16 |
| 5,305,191 A | 4/1994 | Loftus, Jr. | 363/17 |
| 5,363,020 A | 11/1994 | Chen et al. | 315/209 R |
| 5,384,516 A | 1/1995 | Kawabata et al. | 315/160 |
| 5,402,329 A | 3/1995 | Wittenbreder, Jr. | 363/16 |
| 5,408,150 A | 4/1995 | Wilcox | 327/108 |
| 5,412,557 A | 5/1995 | Lauw | 363/37 |
| 5,418,703 A | 5/1995 | Hitchcock et al. | 363/17 |
| 5,420,779 A | 5/1995 | Payne | 363/56 |
| 5,422,546 A | 6/1995 | Nilssen | 315/219 |
| 5,430,632 A | 7/1995 | Meszlenyi | 363/17 |
| 5,430,641 A | 7/1995 | Kates | 363/133 |
| 5,448,155 A | 9/1995 | Jutras | 323/285 |
| 5,448,467 A | 9/1995 | Ferreira | 363/17 |
| 5,465,039 A | 11/1995 | Narita et al. | 320/32 |
| 5,481,160 A | 1/1996 | Nilssen | 315/209 R |
| 5,510,974 A | 4/1996 | Gu et al. | 363/134 |
| 5,514,921 A | 5/1996 | Steigerwald | 307/125 |
| 5,546,300 A | 8/1996 | Lee et al. | 363/132 |
| 5,559,688 A | 9/1996 | Pringle | 363/89 |
| 5,615,093 A | 3/1997 | Nalbant | 363/25 |
| 5,619,402 A | 4/1997 | Liu | 363/20 |
| 5,638,260 A | 6/1997 | Bees | 363/17 |
| 5,646,836 A | 7/1997 | Sadarnac et al. | 363/98 |
| 5,652,501 A | 7/1997 | McClure et al. | 320/17 |
| 5,669,238 A | 9/1997 | Devers | 62/657 |
| 5,675,280 A | 10/1997 | Nomura et al. | 327/538 |
| 5,684,683 A | 11/1997 | Divan et al. | 33/65 |
| 5,694,007 A | 12/1997 | Chen | 315/247 |
| 5,698,964 A | 12/1997 | Kates et al. | 320/22 |
| 5,712,533 A | 1/1998 | Corti | 315/169.3 |
| 5,715,155 A | 2/1998 | Shahani et al. | 363/132 |
| 5,719,474 A | 2/1998 | Vitello | 315/307 |
| 5,723,970 A | 3/1998 | Bell | 320/30 |
| 5,731,652 A | 3/1998 | Shimada | 310/316 |
| 5,736,842 A | 4/1998 | Jovanovic | 323/222 |
| 5,742,495 A | 4/1998 | Barone | 363/65 |
| 5,742,496 A | 4/1998 | Tsutsumi | 363/95 |
| 5,744,915 A | 4/1998 | Nilssen | 315/209 R |
| 5,748,457 A | 5/1998 | Poon et al. | 363/16 |
| 5,764,494 A | 6/1998 | Schutten et al. | 363/17 |
| 5,774,346 A | 6/1998 | Poon et al. | 363/17 |
| 5,781,418 A | 7/1998 | Chang et al. | 363/16 |
| 5,781,419 A | 7/1998 | Kutkut et al. | 363/17 |
| 5,784,266 A | 7/1998 | Chen | 363/16 |
| 5,796,598 A | 8/1998 | Nowak et al. | 363/37 |
| 5,818,172 A | 10/1998 | Lee | 315/86 |
| 5,834,889 A | 11/1998 | Ge | 313/493 |
| 5,844,540 A | 12/1998 | Terasaki | 345/102 |
| 5,854,617 A | 12/1998 | Lee et al. | 345/102 |
| 5,856,916 A | 1/1999 | Bonnet | 363/20 |
| 5,875,103 A | 2/1999 | Bhagwat et al. | 363/17 |
| 5,880,940 A | 3/1999 | Poon | 363/20 |
| 5,886,477 A | 3/1999 | Honbo et al. | 315/209 PZ |
| 5,886,884 A | 3/1999 | Baek et al. | 363/48 |
| 5,894,412 A | 4/1999 | Faulk | 363/56 |
| 5,910,709 A | 6/1999 | Stevanovic et al. | 315/225 |
| 5,917,722 A | 6/1999 | Singh | 363/132 |
| 5,920,475 A | 7/1999 | Boylan et al. | 363/127 |
| 5,923,129 A | 7/1999 | Henry | 315/307 |
| 5,930,121 A | 7/1999 | Henry | 363/16 |
| 5,932,976 A | 8/1999 | Maheshwari et al. | 315/291 |
| 5,939,830 A | 8/1999 | Praiswater | 315/DIG. 4 |
| 5,946,200 A | 8/1999 | Kim et al. | 363/17 |
| 6,011,360 A | 1/2000 | Gradzki et al. | 315/244 |
| 6,114,814 A | 9/2000 | Shannon et al. | 315/219 |
| 6,118,254 A | 9/2000 | Faulk | 320/141 |
| 6,246,215 B1 | 6/2001 | Popescu-Stanesti | 320/139 |
| 6,316,881 B1 | 11/2001 | Shannon et al. | 315/219 |
| 6,326,771 B1 | 12/2001 | Popescu-Stanesti | 320/139 |
| 6,396,722 B2 | 5/2002 | Lin | 363/98 |

OTHER PUBLICATIONS

"Phase Shifted, Zero Voltage Transition Design Considerations and the UC3875 PWM Controller", by Bill Andreycak, Unitrode, Application Note, May 1997, pp. 1–14.

"Fixed–Frequency, Resonant–Switched Pulse Width Modulation with Phase–Shifted Control", by Bob Mammano and Jeff Putsch, from *Power Supply Design Seminar,* Unitrode, 1991, pp. 5–1 to 5–7.

"Zero Voltage Switching Resonant Power Conversion", by Bill Andreycak, from *Power Supply Design Seminar,* Unitrode, 1991, pp. A2–1 to A2–24; and A2–1A 2–1 to A2–3A.

"Resonant Mode Converter Topologies", by Bob Mammano, from *Power Supply Design Seminar,* Unitrode, 1991, pp. P3–1 to P3–12.

"The New UC3879 Phase–Shifted PWM Controller Simplifies the Design of Zero Voltage Transition Full–Bridge Converters", by Laszlo Balogh, Unitrode, Application Note, 1995, pp. 1–8.

"A Comparative Study of a Class of Full Bridge Zero–Voltage–Switched PWM Converters", by W. Chen et al., 1995 IEEE, pp. 893–899.

"Optimum ZVS Full–Bridge DC/DC Converter with PWM Phase–Shift Control: Analysis, Design Considerations, and Experimental Results", by Richard Red I et al., 1994 IEEE, pp. 159–165.

"A Frequency/PWM Controlled Converter with Two Independently Regulated Outputs", by R.A. Fisher et al., HFPC, May 1989, pp. 459–471.

"Feasible Characteristic Evaluations of Resonant Tank PWM Inverter–Linked DC–DC High–Power Converters for Medical–Use High–Voltage Application", by H. Takano et al., 1995 IEEE, pp. 913–919.

"High Density Power–Hybrid Design of a Half–Bridge Multi–Resonant Converter", by Richard Farrington, et al., HFPC–Virginia Polytechnic Institute, May 1990, pp. 26–33.

"Small–Signal Analysis of the Zero–Voltage Switched Full–Bridge PWM Converter", by V. Vlatkovic et al., HFPC–virginia Polytechnic Institute, May 1990, pp. 262–272.

ADAPTIVE LCD POWER SUPPLY CIRCUIT

FIELD OF THE INVENTION

This invention relates to power supplies, and more particularly to an adaptive power supply circuit for adjusting at least one supply parameter for an associated load such as a Liquid Crystal Display (LCD) panel of an electronic device.

BACKGROUND OF THE INVENTION

Liquid Crystal Display (LCD) screens are used in a variety of devices given their size, relatively low cost, and high resolution. Such devices typically include portable electronic devices and non-portable electronic devices. Portable electronic devices may include laptop computers, cell phones, pagers, personal digital assistants, and the like, while non-portable electronic devices make include televisions, desktop PCs, industrial controls, and the like. While such non-portable electronic devices consume modest amounts of power individually, in combination they consume a significant amount of power. Any improvements therefore in the energy efficiency of such non-portable devices are therefore desirable.

Manufacturers are also constantly striving to reduce power consumption of portable electronic devices without degradation of performance. Such portable devices are typically powered by some type of battery, but may be powered with other voltage sources such as a solar source. In the case of a rechargeable battery powered portable electronic devices, reduced power consumption enables the device to operate for longer periods of time between charging of the battery and/or to have a smaller size battery.

Typically, the LCD panel that drives an LCD of an electronic device and its backlight receives voltage directly from the power source of the electronic device. For example, the power source may be a battery for a portable electronic device. This decreases energy efficiency for such devices when select load modules such as the backlight and/or the LCD panel do not need the full available voltage from the power source.

Accordingly, there is a need in the art for an adaptive power supply circuit that overcomes the above deficiencies in the prior art to allow for appropriate power supply levels to be applied to select load modules.

BRIEF SUMMARY OF THE INVENTION

A power supply circuit consistent with the invention for adjusting at least one supply parameter in response to at least one load parameter of at least one associated load includes: a feedback path configured to sense at least one load parameter and provide a control signal based on at least one load parameter; and a regulating circuit configured to accept the control signal and regulate the at least one supply parameter based on the control signal. The feedback path may include a first path providing a first signal representative of a first load condition of a first load module and a second path providing a second signal representative of a second load condition of a second load module, wherein the control signal is based on a comparison of the first signal and the second signal.

An electronic device consistent with the invention includes: a liquid crystal display (LCD) panel circuit; and an adaptive LCD power supply circuit for adjusting at least one supply parameter in response to at least one load parameter of at least one associated load, wherein one of at least one associated loads is an LCD panel circuit, the adaptive LCD power supply circuit includes: a feedback path configured to sense at least one load parameter and provide a control signal based on at least one load parameter; and a regulating circuit configured to accept the control signal and regulate the at least one supply parameter based on the control signal.

An adaptive LCD power supply circuit for adjusting at least one supply parameter in response to a load condition from one of a plurality of load modules, the adaptive LCD power supply circuit consistent with the invention includes: a first path providing a first signal representative of a load condition of a first load module; a second path providing a second signal representative of a load condition of a second load module; a minimum decision circuit configured to accept the first signal and the second signal and output a third signal equal to the lesser of the first signal and the second signal; and a regulating circuit configured to accept a control signal based on the third signal and regulate the at least one supply parameter based on the control signal.

A method of adjusting at least one supply parameter in response to at least one load parameter of an LCD panel circuit consistent with the invention includes the steps of: sensing at least one load parameter; providing a signal representative of at least one load parameter; and adjusting at least one supply parameter based on the signal.

Another method of adjusting at least one supply parameter consistent with the invention includes the steps of: sensing at least one load parameter from a first load module and providing a first signal representative of at least one load parameter from the first load module; sensing at least one load parameter from a second load module and providing a second signal representative of at least one load parameter from the second load module; comparing the first signal and the second signal and providing a third signal equal to the lesser of the first signal and the second signal; and adjusting at least one supply parameter based on the third signal.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
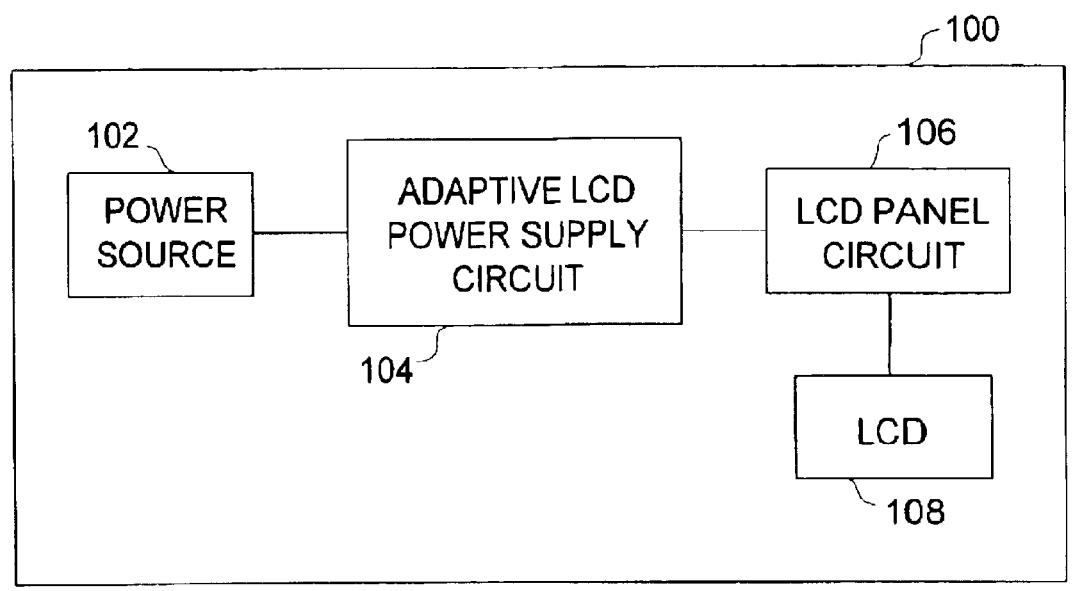
FIG. 1 is a block diagram of an electronic device having an adaptive LCD power supply circuit consistent with the invention.

Turning to FIG. 1, a simplified block diagram of an electronic device 100 having an adaptive LCD power supply circuit 104 consistent with the invention is illustrated. The electronic device 100 may be a portable or non-portable electronic device utilizing an LCD 108. Portable electronic devices may include laptop computers, cell phones, pagers, personal digital assistants, and the like, while non-portable electronic devices may include televisions, desktop PCs, automotive controls, industrial controls, and the like.

The electronic device 100 includes a power source 102 for supplying power to all the components of the device 100 including the LCD 108 driven by the LCD panel circuit 106.

The LCD 108 may be any variety of display, e.g., an active matrix or passive matrix display, and the LCD panel circuit 106 may be any type of driving circuit known to those skilled in the art. The power source 102 may be any variety of power sources for providing power to the electronic device. For portable electronic devices, the power source 102 may be a stand alone power source such a rechargeable battery, e.g., lithium, nickel-cadmium, or nickel-metal hydride batteries, or a solar power source. The power source may also be various external adapters such as an AC/DC "block" adapter or DC "cigarette" type adapter to provide power to the portable electronic device. Such adapters may also provide power to recharge batteries for those devices having rechargeable batteries. For non-portable electronic devices the power supply may be an AC/DC converter for converting conventional 120 volt AC power from an outlet to a DC voltage level.

Advantageously, an electronic device 100 consistent with the invention includes an adaptive LCD power supply circuit 104 coupled to the power source 102 and the LCD panel circuit 106. In general, the adaptive LCD power supply circuit 104 monitors at least one load parameter from the LCD panel circuit 106 and regulates at least one supply parameter supplied from the power source 102 such that the supply parameter is adjusted to match the load parameter.

In one exemplary embodiment, the load parameter may be a load voltage and the supply parameter may be supply voltage. In this way, the adaptive LCD power supply circuit 106 provides adaptive or load following voltage to the LCD panel circuit 106 that follows the instantaneous voltage requirements of the LCD panel circuit 106 as display conditions on the LCD 108 vary. As such, power dissipation is minimized. Therefore, the power efficiency of the device 100 is substantially improved. For a portable electronic device having a rechargeable battery for a power source 102, this enables the device to have prolonged times between recharging of its battery, and/or to have a smaller size battery.

Figure 2:
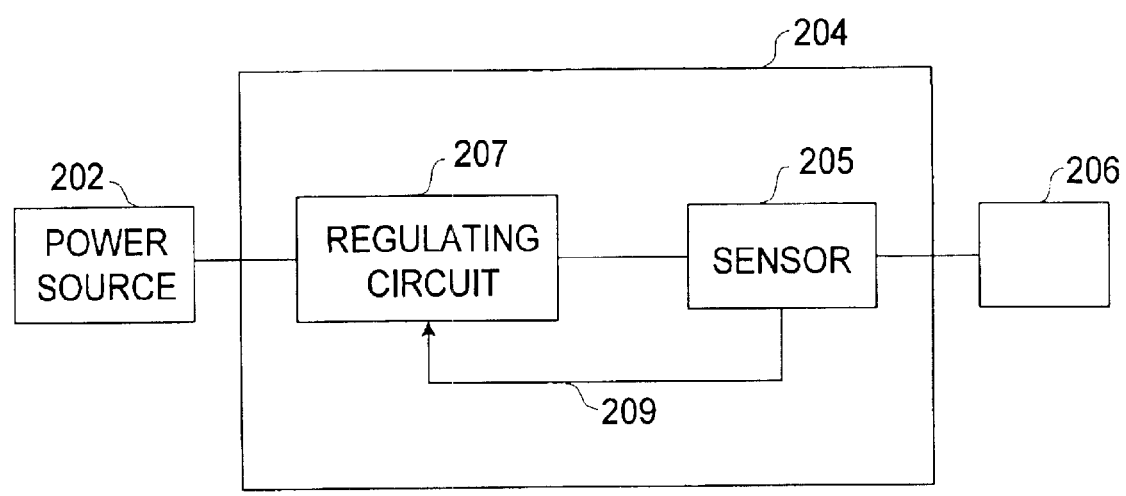
FIG. 2 is a simplified block diagram of the adaptive LCD power supply circuit of FIG. 1.

Turning to FIG. 2, a simplified block diagram of an adaptive LCD power supply circuit 204 consistent with the invention is illustrated. The adaptive LCD power supply circuit 204 includes a feedback path. The feedback path may include the sensor 205 and a conducting path 209 coupling the sensor 205 to the regulating circuit 207. The feedback path may be configured to sense at least one load parameter of the LCD panel circuit 206 and provide a feedback control signal along the conducting path 209 to the regulating circuit 207. The regulating circuit 207 may be responsive to the control signal to adjust at least one supply parameter from the power source 202 such that the supply parameter is driven to match the load parameter.

The regulating circuit 207 may be a variety of circuits known to those skilled in the art for regulating a predetermined power parameter. For instance, the regulating circuit may be a DC/DC converter where the supply parameter to be adjusted is DC voltage. Such a regulating circuit 207 may also include a pulse width modulated (PWM) switching transistor circuit functioning as a DC-DC converter. The PWM signal may be generated by a comparator comparing the output signal from a respective error amplifier, e.g., error amplifier 334 of FIG. 3, with an input ramp signal. The resulting PWM signal may then control a switching circuit to boost, e.g., with the switching transistor in parallel with the load, or buck, e.g., with a switching transistor in series with the load, the input DC voltage to the desired output DC voltage level.

Figure 3:
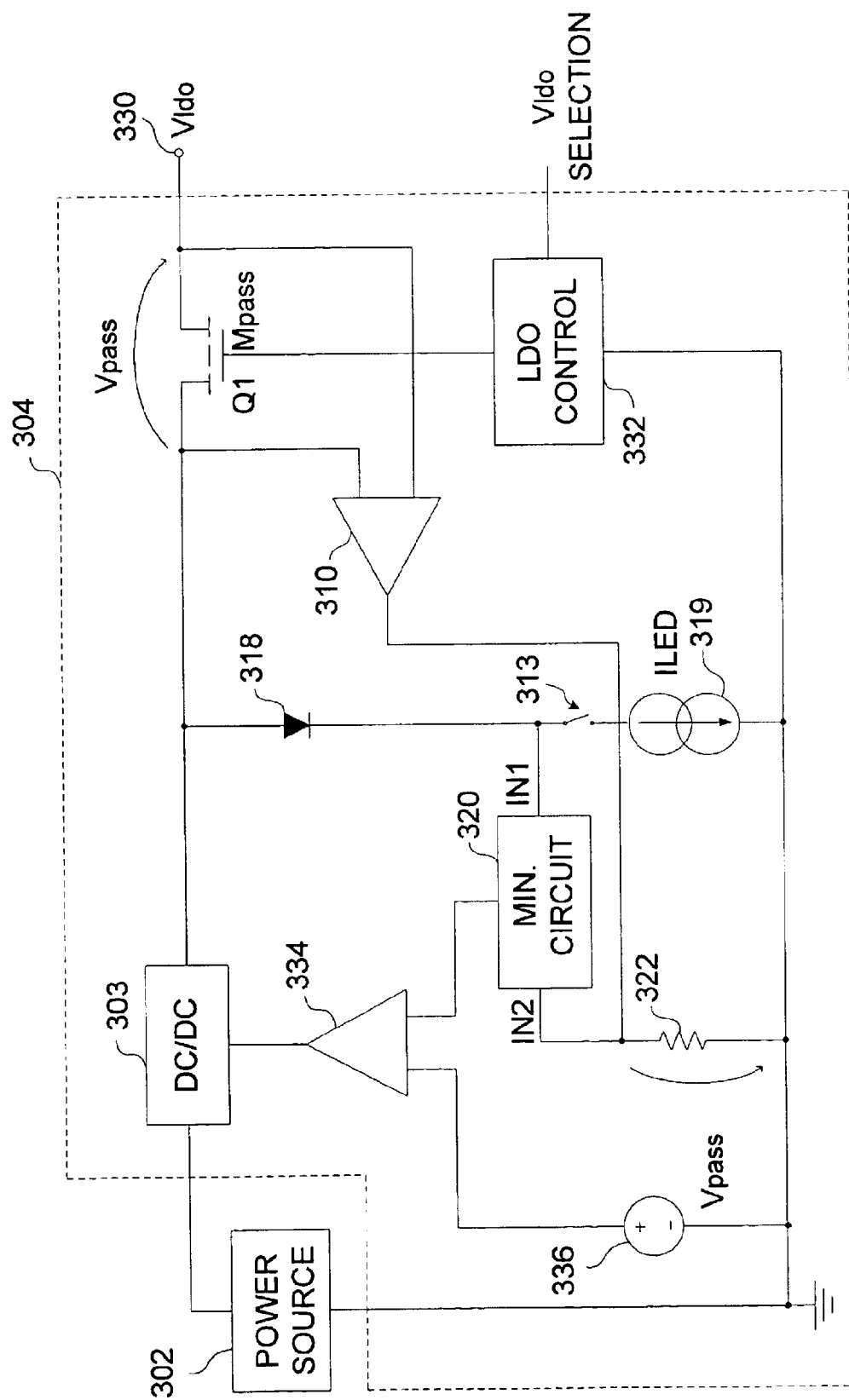
FIG. 3 is a more detailed block diagram of one exemplary adaptive LCD power supply circuit consistent with the invention.

Turning to FIG. 3, a block diagram of one exemplary embodiment of an adaptive LCD power supply circuit 304 is illustrated. In this exemplary embodiment, the sensed load parameter is DC load voltage and the regulated supply parameter is DC supply voltage. A feedback path to the DC/DC converter 303 may include two paths. One path may include a light source such as the Light Emitting Diode (LED) 318, a current source 319, and a switch 313. This path provides a signal to the minimum decision circuit 320 at the input terminal In1. The current source 319 sets the current for the LED 318. The LED 318 may function as a backlight for an LCD panel. Another path may include a sensor, e.g. transistor Q1, to provide another signal to the input terminal In2 of the minimum decision circuit 320. The first path provides a signal to the minimum decision circuit 320 which is representative of the voltage across the current source 319 when the switch 313 is closed and representative of the voltage output from the DC/DC converter when the switch 313 is open. The other path provides another control signal to the minimum decision circuit 320 representative of the voltage across transistor Q1.

The transistor Q1 may be a variety of transistor types including a p-channel MOSFET. An LDO control 332 may be coupled to the gate of the transistor Q1 to control the state of the transistor Q1 and whether or not power is supplied to a load at the output terminal 330. When power is provided by the power source 302 to a load, e.g., an LCD panel circuit, at output terminal 330, the voltage Vpass across the source and drain of the transistor Q1 varies in proportion to load changes and voltage requirements. Hence, as the instantaneous load requirements of an LCD load panel circuit (not illustrated) which may be coupled to the output terminal 330 changes, the voltage level Vpass across the source and drain changes proportionately. The voltage level Vpass may then be input to a sense amplifier 310, which amplifies the voltage level relative to ground and may then be input to a second input terminal of the minimum decision circuit 320.

The minimum decision circuit 320 compares the voltage signal from the first path input to input terminal In1 with the voltage signal from the other path input to its other input terminal In2, and provides an output signal equal to the lesser of the two voltage levels to an error amplifier 334. The error amplifier 334 compares a reference voltage level provided by a reference voltage source 336 to the voltage level output from the minimum decision circuit 320 to provide a control signal to the DC/DC converter 303. When the output of the minimum decision circuit 320 is equal to the reference voltage signal provided by the reference source 336 then the control signal from the error amplifier 334 instructs no change to be made to the output voltage of the DC/DC converter 303. If the output of the minimum decision circuit 320 is less than the reference voltage, then the control signal instructs the DC/DC converter 303 to increase its output voltage. Conversely, if the output of the minimum decision circuit 320 is greater than the reference voltage, then the control signal instructs the DC/DC converter 303 to decrease its output voltage.

In the exemplary embodiment of FIG. 3, the LED 318 provides backlight to an LCD. If the LED is on and the switch 313 is accordingly closed, an LCD panel circuit coupled to the output terminal 330 may require a lower voltage than the voltage required by the LED. As such, the voltage drop across Q1 is relatively large and the output of the DC/DC converter 303 is controlled by the first path to maintain the voltage across the current source 319 equal to the reference voltage provided by the reference voltage source 336. Alternatively, if the LED is off and the switch 313 is accordingly open, the output of the DC/DC converter 303 may be controlled by the second path to maintain the voltage drop across the transistor Q1 equal to the reference voltage provided by the reference voltage source 336. In order to minimize power losses, a minimum voltage drop across transistor Q1 and the current source 319 set by the reference source 336 should be maintained. An adaptive liquid crystal display power supply circuit consistent with the invention keeps one of these two voltage levels equal to the reference voltage level depending on the relative signal levels input at In1 and In2 to the minimum decision circuit 320.

For example, assume the reference voltage level provided by the reference source 336 is 0.2 volts, the voltage required at output terminal 330 is 3.3 volts at a particular instant, and the voltage drop on the LED 318 functioning as a backlight to an LCD is 8.0 volts.

If the LED 318 is enabled in this particular example, switch 313 is closed. As such, the voltage at the output of the DC/DC converter 303 needs to be 8.2 volts to properly supply the voltage for the backlight and to account for the voltage drop of about 0.2 volts across the current source 319. In this instance, the voltage drop across Q1 is higher at 4.9 volts such that the desired voltage of 3.3 volts is provided at the output terminal 330. Since the voltage drop across the current source 319 in this instance (0.2 volts), is less than the voltage drop across transistor Q1 (4.9 volts), the minimum decision circuit will select 0.2 volts and the control of the DC/DC converter will be controlled by the first path input to the input terminal In1 of the minimum decision circuit 320.

If the LED 318 is disabled in this particular example, switch 313 is open. As such, the voltage at the output of the DC/DC converter 303 may be advantageously decreased to 3.5 volts compared to a voltage level of 8.2 volts that may otherwise be provided at all times. Since the voltage drop across the transistor Q1 of about 0.2 volts is less than the voltage output from the DC/DC converter 303 of 3.5 volts, the minimum decision circuit will select 0.2 volts and the control of the DC/DC converter will be controlled by the other path input to the input terminal In2 of the minimum decision circuit 320.

As such, the DC/DC converter 303 is advantageously responsive to the control signal from the error amplifier 334 to adjust its output DC voltage level to match that of the DC load voltage level. As such, an adaptive LCD power supply circuit 304 consistent with the invention includes a regulating circuit, e.g., DC/DC converter 303, that regulates or adjusts its secondary DC voltage to match that of the instantaneous DC load voltage requirements of a load module such as the LED 318 serving as a backlight for an LCD or a separate load module such as an LCD panel circuit coupled to the output terminal 330 depending on a comparison made by the minimum decision circuit 320.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A power supply circuit for adjusting at least one supply parameter in response to at least one load parameter of at least one associated load comprising:
   a feedback path configured to sense said at least one load parameter and provide a control signal based on said at least one load parameter; and
   a regulating circuit configured to accent said control signal and regulate said at least one supply parameter based on said control signal, wherein said feedback path comprises a first path providing a first signal representative of a first load condition of a first load module and a second path providing a second signal representative of a second load condition of a second load module, wherein said control signal is based on a comparison of said first signal and said second signal, and wherein said feedback path further comprises a minimum decision circuit configured to accept said first signal and said second signal and output a third signal equal to the lesser of said first signal and said second signal, wherein said control signal is based on said third signal.

2. The circuit of claim 1, wherein said feedback path further comprises an error amplifier configured to accept said third signal and a voltage reference signal from a voltage reference source and provide said control signal to said regulating circuit based on the difference between said third signal and said voltage reference signal.

3. The circuit of claim 1, wherein said first path comprises a light source and a current source, and wherein said first signal is representative of said at least one supply parameter output from said regulating circuit when said light source is disabled, and wherein said first signal is representative of a voltage drop across said current source when said light source is enabled.

4. The circuit of claim 3, wherein said first path further comprises a switch coupled to said light source and said current source, wherein said switch is configured to enable said light source when said switch is closed and disable said light source when said switch is open.

5. The circuit of claim 3, wherein said second path comprises a sensor configured to sense said second load condition of said second load module, and wherein said second signal is representative of a voltage drop across said sensor, said adaptive LCD power supply circuit configured to adjust said second signal such that said voltage drop across said sensor is equal to said reference voltage signal when said second signal is less than said first signal, and said adaptive LCD power supply circuit configured to adjust said first signal such that said voltage drop across said current source is equal to said reference voltage signal when said first signal is less than said second signal.

6. The circuit of claim 5, wherein said sensor is a transistor having a first electrode and a second electrode, and wherein said second signal is representative of a voltage across said first and second electrode.

7. The circuit of claim 6, wherein said transistor is a P-type MOSFET transistor, said first electrode is a source electrode and said second electrode is a drain electrode.

8. An electronic device comprising:
   a liquid crystal display (LCD) panel circuit; and
   an adaptive LCD power supply circuit for adjusting at least one supply parameter in response to at least one load parameter of at least one associated load, wherein one of said at least one associated load is an LCD panel circuit, said adaptive LCD power supply circuit comprising:
   a feedback path configured to sense said at least one load parameter and provide a control signal based on said at least one load parameter; and
   a regulating circuit configured to accept said control signal and regulate said at least one supply parameter based on said control signal, wherein said feedback path comprises a first path providing a first signal representative of first load condition of a first load module and a second path providing a second signal representative of a second load condition of said LCD panel circuit, wherein said control signal is based on a comparison of said first signal and said second signal, and wherein said feedback path further comprises a minimum decision circuit configured to accept said first signal and said second signal and output a third signal equal to the lesser of said first signal and said second signal, wherein said control signal is based on said third signal.

9. The device of claim 8, wherein said first path comprises a light source and a current source, and wherein said first signal is representative of said at least one supply parameter output from said regulating circuit when said light source is disabled, and wherein said first signal is representative of a voltage drop across said current source when said light source is enabled.

10. The device of claim 9, wherein said first path further comprises a switch coupled to said light source and said current source, wherein said switch is configured to enable said light source when said switch is closed and disable said light source when said switch is open.

11. The device of claim 9, wherein said second path comprises a sensor configured to sense said second load condition of said LCD panel circuit, and wherein said second signal is representative of a voltage drop across said sensor, said adaptive LCD power supply circuit adjusting said second signal such that said voltage drop across said sensor is equal to said reference voltage signal when said second signal is less than said first signal, and said adaptive LCD power supply circuit adjusting said first signal such that said voltage drop across said current source is equal to said reference voltage signal when said first signal is less than said second signal.

12. The device of claim 11, wherein said sensor is a transistor having a first electrode and a second electrode, and wherein said second signal is representative of a voltage across said first and second electrode.

13. The device of claim 12, wherein said transistor is a P-type MOSFET transistor, said first electrode is a source electrode and said second electrode is a drain electrode.

14. An adaptive liquid crystal display (LCD) power supply circuit for adjusting at least one supply parameter in response to a load condition from one of a plurality of load modules, said adaptive LCD power supply circuit comprising:
a first path providing a first signal representative of a load condition of a first load module;
a second path providing a second signal representative of a load condition of a second load module;
a minimum decision circuit configured to accept said first signal and said second signal and output a third signal equal to the lesser of said first signal and said second signal; and
a regulating circuit configured to accept a control signal based on said third signal and regulate said at least one supply parameter based on said control signal.

15. The circuit of claim 14, wherein said at least one supply parameter is DC voltage and said regulating circuit is a DC-DC converter.

16. The circuit of claim 14, further comprising an error amplifier configured to accept said third signal and a voltage reference signal from a voltage reference source, wherein said error amplifier is further configured to provide said control signal based on the difference between said third signal and said voltage reference signal.

17. The circuit of claim 14, wherein said first load module is a light source providing backlight for an LCD and said second load module is an LCD panel circuit.

18. The circuit of claim 17, wherein said first path comprises said light source, a current source configured to provide current to said light source, and a switch coupled between said light source and said current source, wherein the position of the switch enables current from said current source to enable or disable said light source.

19. The circuit of claim 18, wherein said first signal is representative of said at least one supply parameter output from said regulating circuit when said switch is open and said light source is disabled, and wherein said first signal is representative of a voltage drop across said current source when said switch is closed and said light source is enabled.

20. The circuit of claim 18, wherein said second path comprises a sensor configured to sense said load condition of said LCD panel circuit, and wherein said second signal is representative of a voltage drop across said sensor, said adaptive LCD power supply circuit is configured to adjust said second signal such that said voltage drop across sensor is equal to said reference voltage signal when said second signal is less than said first signal, and said adaptive LCD power supply circuit is configured to adjust said first signal such that said voltage drop across said current source is equal to said reference voltage signal when said first signal is less than said second signal.

21. The circuit of claim 20, wherein said sensor is a transistor having a first electrode and a second electrode wherein a voltage across said first and second electrode is representative of said load condition of said second load module.

22. The circuit of claim 21, wherein said transistor is a P-type MOSFET transistor, said first electrode is a source electrode, and said second electrode is a drain electrode.

23. The circuit of claim 14, wherein said second path comprises a sensor configured to sense said load condition of said second load module.

24. A method of adjusting at least one supply parameter comprising the steps of:
sensing at least one load parameter from a first load module and providing a first signal representative of said at least one load parameter from said first load module;
sensing at least one load parameter from a second load module and providing a second signal representative of said at least one load parameter from said second load module;
comparing said first signal and said second signal and providing a third signal equal to the lesser of said first signal and said second signal; and
adjusting said at least one supply parameter based on said third signal.

25. The method of claim 24, further comprising the steps of:
providing a reference signal; and
comparing said reference signal with said third signal and providing a control signal for adjusting said at least one supply parameter based on said control signal until said third signal equals said reference signal.

26. The method of claim 25, further comprising the step of:
increasing said at least one supply parameter when said third signal is less than said reference signal.

27. The method of claim 25, further comprising the step of:
decreasing said at least one supply parameter when said third signal is greater than said reference signal.

* * * * *